Aug. 18, 1953
B. WALKER
2,649,151
VENETIAN BLIND
Filed April 26, 1948
3 Sheets-Sheet 3
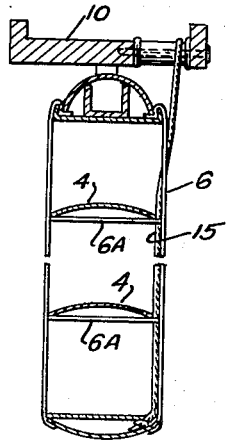
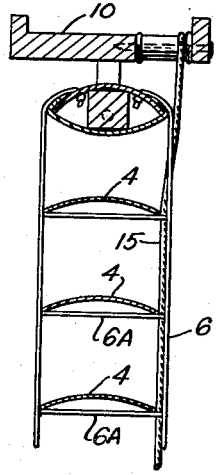
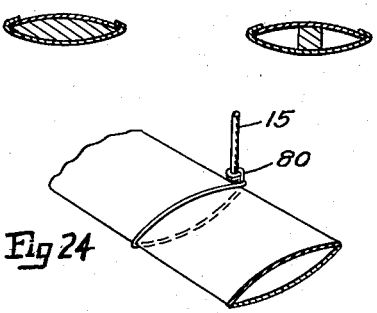
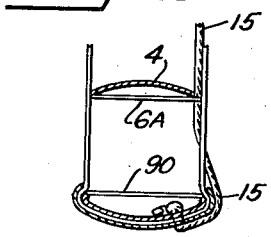
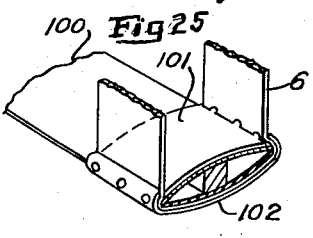
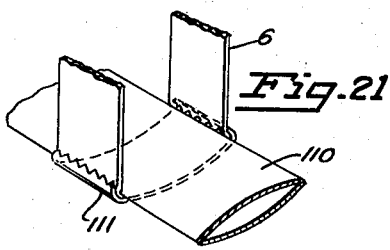
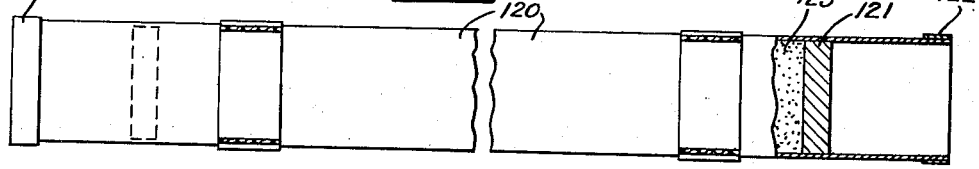
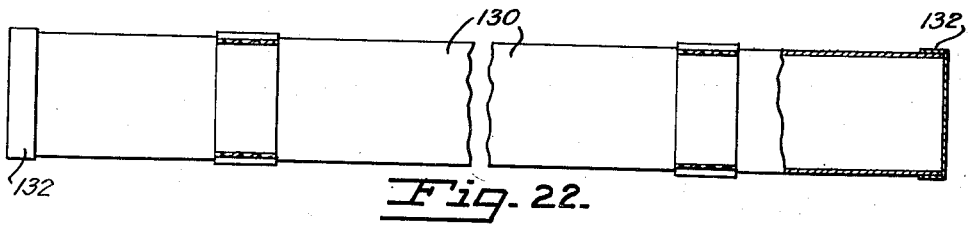
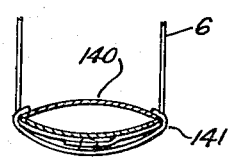
INVENTOR.
Brooks Walker
BY Patented Aug. 18, 1953

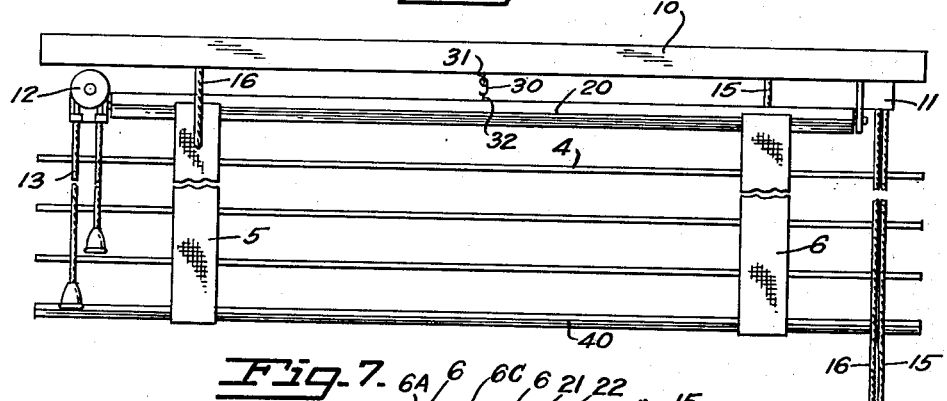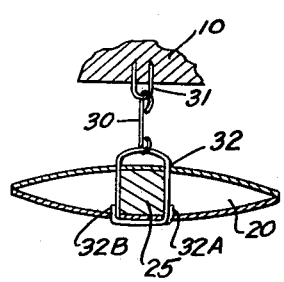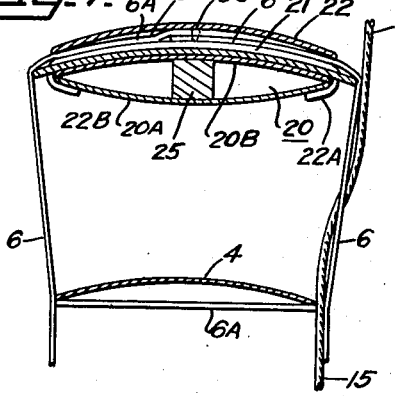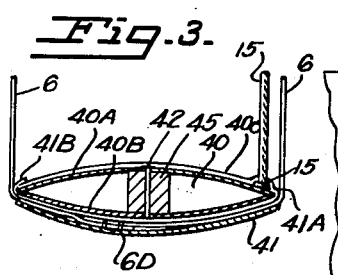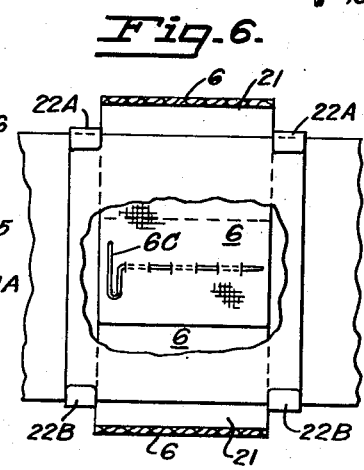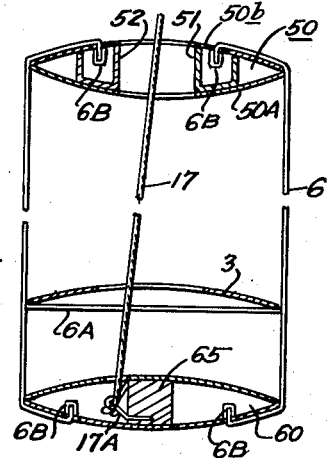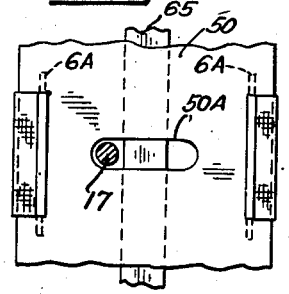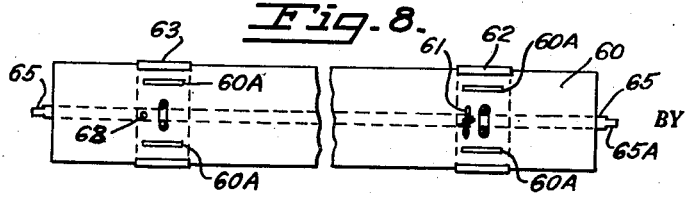

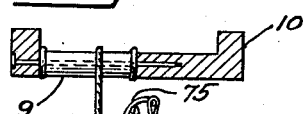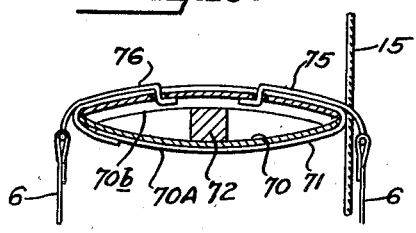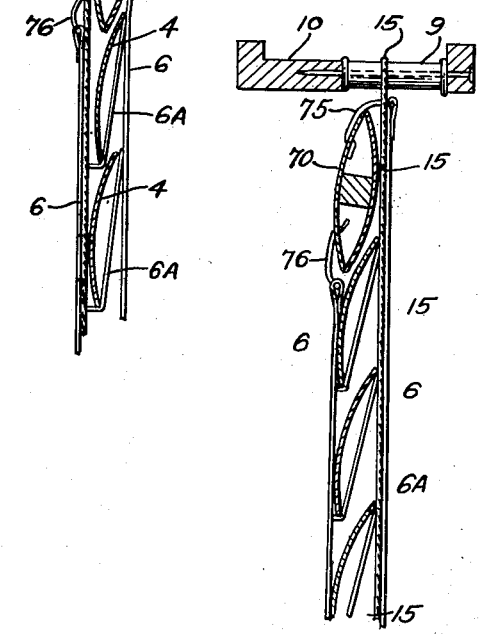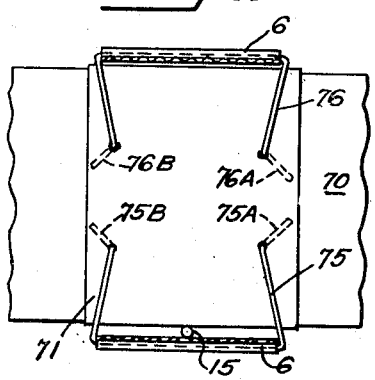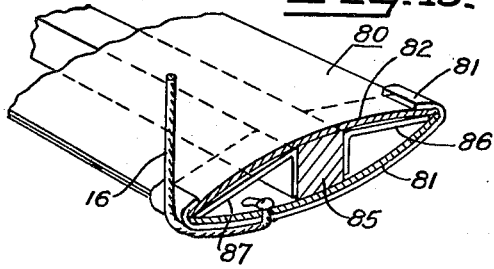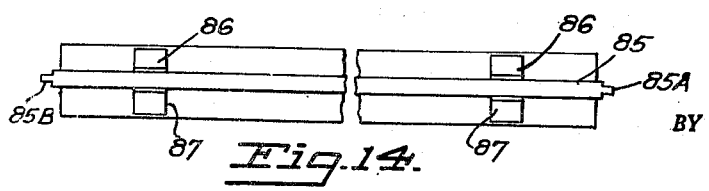

2,649,151

UNITED STATES PATENT OFFICE 2,649,151

VENETIAN BLIND

Brooks Walker, Piedmont, Calif.

Application April 26, 1948, Serial No. 23,153

7 Claims. (Cl. 160—178)

This invention pertains to Venetian blinds and improvements in parts therefor, particularly relative to improvements in tilt and bottom rails for Venetian blinds, wherein such rails can be made from metallic or fibre or plastic slats which are generally used for the light closure by placing such curved slats with the curved surfaces away from each other and the edges touching and with some kind of a stiffener or filler in between to provide the necessary weight or stiffness required in rails. Other objects of the invention are improved methods of providing a center support for Venetian blind rails, particularly rails of this construction, improved methods of detachably securing the ladder tapes to the rails, an improved method of increasing the relative motion of the side members of the ladder tape during the tilting of the tilt rail by increasing the effective width of the pivoting support for the side members of the ladder tape where they are supported by the tilt rail as compared to the tilt rail width.

The invention also pertains to various methods of securing the slats together to form rails, either by cementing the slats to a center stiffener, cementing them together where they contact at the edges, riveting them to the center support, wiring them to the center support, or cementing them to stiffener members as well as means for securing them together or to the stiffener member by means of clips around the edges of the slats forming the rails. A further object of the invention is to form the rails from slats by bending over the edges of one of the slats and inserting another slat of standard or reduced width in a crowned position in engagement with the curled edges of the first slat and then adding weight or stiffness if necessary by a filler or reinforcing member in between the two slats.

Further objects of the invention will be made clear in the attached specification, drawings, and claims.

I have illustrated my invention by way of example in the accompanying drawings, in which:

Figure 1 is a plan view, partly cut away, showing one form of the invention.

Figure 2 is an enlarged end view of the center support mechanism as applied to the head rail in the design shown in Figure 1.

Figure 3 is an enlarged end view through the bottom rail at about the right hand ladder tape of Figure 1.

Figure 4 is a sectional view of a slight modification in tilt rail and bottom rail and means for attaching ladder tapes where a center lift cord is used passing through the slats.

Figure 5 is a cut away view of a fragment of a bottom rail shown in Figure 4.

Figure 6 is a view of a portion of a tilt rail, partly cut away, showing another from of the invention.

Figure 7 is an end view of a tilt rail and first slat and ladder tape showing a construction similar to that in Figure 6.

Figure 8 is a reduced plan view of a bottom rail as viewed from below of a construction similar to that shown in Figures 4 and 5.

Figure 9 is a top plan view of a portion of a tilt rail and showing an alternate method of attaching the ladder tapes.

Figure 10 is an end view through the center of Figure 9.

Figure 11 is a view of a portion of a blind showing the tilt rail fully tilted in one direction with the same construction as is shown in Figures 9 and 10.

Figure 12 is similar to Figure 11, but shows the same fragment of a blind taken at the other lifting cord position.

Figure 13 is a perspective view showing a portion of a bottom rail embodying another form of the invention.

Figure 14 is a reduced scale view of a bottom rail similar to that shown in Figure 13, but with one of the covering slats removed.

Figure 15 is a cut away end section view of another form of the invention.

Figure 16 is a sectional end view of a portion of a blind showing another form of the invention.

Figure 17 is a sectional end view of another form of Venetian blind rail construction.

Figure 18 is an end section of another form of Venetian blind rail construction.

Figure 19 is an end section of a bottom rail construction and method of attaching ladder tapes and lifting cords.

Figure 20 is a plan view of another type of rail construction.

Figure 21 is a perspective view, partly cut away, showing a short section of a rail construction and methods of attaching the ladder tapes.

Figure 22 is a plan view, partly cut away, showing another type of rail construction.

Figure 23 is an end view of a portion of a blind showing a rail construction and method of attaching a ladder tape by a clip.

Figure 24 is a perspective view of a short section of rail with another method of attaching the lift cords.

Figure 25 shows a short section of a bottom rail with another method of attaching the ladder tapes to such rail. This view is in section and partly cut away.

In all views, like numerals of reference refer to corresponding parts throughout said views.

In Figure 1 I have shown a head rail 10, a tilt mechanism 12 of any conventional type, with tilt cords 13 to operate the tilt mechanism. A pivot bracket for the tilt rail 20 is shown at 11 which also combines the lifting cord block for cords 15 and 16. Lifting cords 15 and 16 are preferably located at the opposite sides of the slats to provide for removable slats in a construction similar to that shown in my issued Patent No. 2,200,349. The slats 4 are preferably of a curved, flexible cross section, and may be made of metal, plastic, fibre, or other suitable material. However, they may also be made of wood of a relatively flat cross section and the rails may be made as shown whether the slats are of curved section or of flat section. Ladder tapes 5 and 6 may be of any suitable or conventional construction for supporting the slats 4 in spaced relationship and for tilting them for light control positions. Where the slat is long and the blinds are wide, it may be necessary to use a center support to keep the head rail from sagging, particularly where many tapes are necessary.

Such a center support may be provided as shown in Figure 2, wherein a staple of painted or stainless steel wire 32 is inserted through the holes in the curved members of the tilt rail, and the upper surface of the staple is preferably curved on an arc about the center of the pivot of the tilt rail so that as the rail is tilted in either direction the hook 30 can slide around the radius so that the tilt rail may be suitably supported. Any other type of suitable center support well known in the art may also be used if desired.

The rails in these views are preferably formed by using two curved slats and securing them together by means of a clip such as 40c as shown in Figure 3 which is wrapped around the outside of the rail preferably near the points of attachment of the ladder tapes to hold the two slats together at their edges and to make them more rigid at the point of attachment of the ladder tapes and lifting cords. In Figure 3 a slight dimple is placed in the clip 40c near the hole where the lifting cord 15 goes through the clip for attachment thereto by means of the ring 15a crimped on to the end of the lifting cord 15. The ladder tape sides 6 are preferably secured to the bottom rail 40, as shown in Figure 3, by securing the two sides together by means of sewing, staples, pins, or other suitable attachment as at 6d. A clip 41 passes around the clipped together portion of the ladder tape 6 which underlies the bottom rail 40 and extends slightly wider than the ladder tape width so that the ears 41a and 41b on both sides of the ladder tape 6 are crimped around the edges of the bottom rail to secure said clip 41 to the bottom rail and make a neat appearance and closure for the connected ends of the ladder tape 6. These ears may also be of the spring type that can be snapped into place instead of the crimp type. The bottom rail is formed by two curved slats 40a and 40b secured in any suitable manner to a stiffener 45 which may be a square steel section with its sides suitably cemented, vulcanized, or otherwise adhering to the undersurfaces of the slats 40a and 40b. A rivet such as 42 may likewise be used as a means of securing the slats to the stiffener member, or (as shown in Figure 8) a wire 61 may go through holes perforated in the slats and twisted together to form a tight closure around the supporting rod 45 or 65. For the construction shown in Figure 3 it is not necessary to punch any holes in the slats where the ladder tapes or lifting cords are attached, as the attachment is by means of the clip 40c that holds the slats rigidly together at their edges and the ladder tape 6 is secured to the bottom or top rail by means of securing the ends together and covering it neatly with a clip 41.

In Figure 4 I have shown a slightly different construction in which a conventional placement of the lifting cords through the center of the slats using a conventional route hole is employed. The tilt rail in this case must provide for a passage of the lift cord in the tilted position and two stiffeners 51 and 52 are employed in this case using channel sections and suitably cementing or riveting the slats to these two channel members which may be connected by spacers at different points throughout the length of the slats or may be suitably cemented to the side slats which form the rails. Riveting, stapling, spot welding, or other suitable means may also be used for securing the slats to the stiffener members or to each other, also clips may be used around the slats securing them partly together at their edge.

In Figures 4 and 5 the method of detachably securing the ladder tapes to the rails is by means of a clip 6a which is crimped on to the edges of the side members of the ladder tape and inserted through openings in the slats which form the tilt and bottom rails. Members 6a are longer than the openings, and when inserted through the openings and pushed to one side, they can be brought back into the position shown in Figure 5 wherein the longer ends form the locks to prevent the ends of the ladder tapes and clips 6a from pulling out of the openings to form a suitable attachment for the side members of the ladder tape and the tilt and bottom rails. This is also a readily detachable construction and can be easily manufactured by the simple punch press to cut the necessary openings such as are shown in Figure 8 as 60a. Lift cord 17 may go through the conventional route hole 50a and be tied in a knot and pulled in from the end of the slats which form the rails to provide a knot which is not readily visible or objectionable in location, or the cord may go around the stiffener 65 and be suitably secured to the bottom rail.

In Figures 6 and 7 I have shown a construction whereby greater motion may be obtained by the opposite sides of the ladder tape when the tilt rail is tilted than if the ladder tape were attached to the normal width of the tilt rail. This is obtained by using a tilt rail of this construction wherein the rail itself is thin and formed of two slats 20a and 20b suitably secured to a stiffener 25 by riveting, stapling, clipping, cementing, or other suitable means. An adapter 21 is placed on top of the tilt rail to spread the sides of ladder tape 6 farther apart to give the effect of a wider tilt rail. This adapter 21 has step back edges which are kept in place by being behind ears 22a and 22b of the clip 22 which covers the top of the ladder tape 6a where it passes over the tilt rail and is secured by sewing, staples, pins, etc., at 6c. Ladder rung 6a may be left in place and placed over the tilt rail if the tilt rail is so thin that this provides the approximate correct position between the tilt rail and the first slat 4 below the tilt rail. It also provides a ready means of indicating the correct position where the two ends of the ladder tape 6 should be secured together. The ears 22a and 22b are suitably snapped or bent over the edges of the tilt rail to hold the adapter 21 and the ladder tapes in proper position, and to add a neat appearance. The portion of the clip 22 that covers the ladder tape does not extend beyond the edge of the tilt rail or does not need to extend beyond the edge of the tilt rail so that the same general clip can also be used at the bottom rail where it is not necessary to use the adapter 21 as the extra width at the bottom rail is not necessary in order to get correct closing. To improve the operation of the blind in raising and lowering during the partially or almost completely tilted position, I have found that it is much better to have the lift cords 15 and 16 pass around the point of attachment of the ladder tapes to the tilt rail and come down somewhere near where the first slat is attached to the ladder or is carried on the first rung of the ladder tape and there go through a hole in the ladder tape which may be provided with a grommet to reduce wear or other suitable treatments which might be plasticizing or impregnating with stiffening material at the point where the lift cord passes through the side member of the ladder tape. A hole forced through the ladder tape as by a pointed, tapered instrument has been found to be very suitable to separate the threads that form the ladder tape and provide a suitable opening through which the lifting cord can operate with a minimum of friction. By passing the lifting cords through the ladder tapes at a point below the point of attachment to the tilt rail and near the point where the top slat is attached the operation of the blind is greatly improved by being able to raise and lower in positions of high tilt of the tilt rail in either direction. It also simplifies materially the problem of attaching the ladder tapes to the tilt rail for offset cords used for removable slat blinds. Throughout these various figures and drawings, the slats may be suitably attached to the ladder rungs by tongues, as shown in my U. S. Patent No. 2,311,716, by snaps or notches as are all well known in the art at this time, or by any other suitable method.

In Figure 8 the bottom rail is shown with clips 62 and 63 securing the edges of the slats together, a center stiffener 65 to which the slats are secured by a twisted wire 61 or rivet 68 or cement or any other suitable method. The ends of the stiffener may protrude for engagement with the tilting mechanism if used as a tilt rail and as a pivot on the other end or for use in connection with hold downs if used as a bottom rail. However, the stiffener member need not come out the end of the covering slats and the ends may be neatly covered with a cap as shown in Figure 22 if desired.

In Figures 9-12 I have shown another form of the invention in which spring steel stainless type wires are inserted through holes in the slats and clips which cover the slats to form suitable supports 75 and 76 for the sides of the ladder tapes 6. This also provides the effect of an increased width in the tilt rail to give better relative action to the side members of the ladder tape when the tilt rail is tilted.

As shown in Figures 9 thru 12 the side members of the ladder tape 6 are preferably sewed or stapled into loops at their upper ends so that the wires 75 and 76 may be inserted through these loops and snapped through the holes in the tilt or bottom rail as shown so that they will not fall out when they become loose and still hold a substantial weight of the blind. The ends 75a and 75b, 76a and 76b are so formed that they will readily snap through the openings in the tilt or bottom rail and still secure the wire supports 75 and 76 to the rails whether in the blind supporting position or in a slack position which may take place when the blind is fully raised and fully supported on the lifting cords 15 and 16. The fact that these wire supports 75 and 76 are pivotly mounted is important so that they can swing out to allow free motion of the lifting cord such as 16, as illustrated in Figure 11. They are also bent downwardly to support the ladder tapes 6 at a point below the edge of the tilt rail so that the lifting cords such as 15 have free motion when in the tilted position as shown in Figure 12.

In Figures 13 and 14 I have shown a method of providing a stiffener for the tilt or bottom rail where it may be necessary to provide the proper tilt or the necessary stiffness for the offset cords. This is provided by means of heavier gauge ears 86 and 87 which are riveted, cemented, or spot welded to the stiffener 85 and preferably located near the ladder tapes or near the lifting cords, as shown in Figure 14. When the two slats that form the outer surface of the rails are suitably clipped together as by clip 81 a very rigid structure is formed without the necessity for any material change in the slats as used for coverings of the rails as compared with the slats as used in the blinds so that the slats to cover the rails can be run off in the automatic machine at the same time the slats are run off for use in the blind, the lengths being the same in the bottom rails and being slightly shorter in the top rails because of the tilt and pivot mechanism. The stiffeners could, obviously, be fastened on top of the stiffener member if the stiffener member were slightly thinner or if it were reduced in thickness if not in section at the point where the stiffeners were attached, in which case the stiffeners could run across from one edge of the slat to the other edge inside of where the edges of the slats come together.

In Figure 15 I have shown another form of rail in which one slat has its edges turned up and the other slat is crowned more highly to fit into the narrower turned edges of the other slat. A channel section may be employed for stiffening with suitable attachment to the slats and the slats may be engaged by sliding them together or by arcing the upper slat more and inserting it in place which may at the same time engage the upper edges of the ladder tapes. A bottom rail similar to the top rail may be used or the bottom rail may be of a construction similar to that shown in Figure 15 where one slat has been reduced in width by clipping or by turning its edge under so that the crown and overall thickness of the bottom rail is less than the top rail.

In Figure 16 the tilt rail is formed by turning the edges of one slat and reducing the width of another slat and inserting it in the turned edges and securing the ladder tapes through openings in the tilt rail similar to the construction shown in connection with Figures 4 and 5.

In Figure 17 the thinner rail section is shown, turning the edges of one slat and inserting another reduced width slat between the turned edges and filling the center with a suitable material for stiffening or weighing the rail thus formed.

Figure 18 is similar to Figure 17 with a metal stiffener section used which is suitably secured to the side members outer covering of the rail.

In Figure 19 the bottom rail 90 is formed by two slats, one turned over at the edges and the other inserted with one edge turned over to reduce the width. The ladder tape is secured together under the bottom rail, the cord 15 passes through an opening in the ladder tape and around the outside of the ladder tape and through a hole which passes through the clip 91 and the slat 90 so that a knot in the center of the section of the bottom rail secures the cord from coming out. The cord, of course, has to pass through an opening in the clip 91 and the ladder tape as well, which prevents the ladder tape from shifting back and forth.

In Figure 25 another form of clip is employed in which toothed adapter 101 goes across the top of the rail 100 and engages the sides of the ladder tape 6 by the teeth of the adapter 101 going through holes in the spring clip 102 which goes around the edge of rail 100.

In Figure 21 another form of attachment of the ladder tapes to the rail section is employed in which a toothed section is crimped or sprung over the edges of the rail 110 so that the clip 111 suitably grips the side members of the ladder tape. This may also be strengthened by passing one of the ladder rungs under the bottom rail 110.

In Figure 20 I have shown a rail section in which a weight or stiffening is added at 123, which may be cement with or without reinforcing, meltable plastic, sand or other material which may or may not require a plug 121 which may be wood, rubber or suitable material or may be a poured plastic or resin type of plug or any other suitable material. Clips 122 may secure the edges of the slats together at their ends, or as in Figure 22, the ends may be covered by caps to present a neater appearance. Said caps may have an opening at their center through which the stiffener member may protrude if it is to be used for a tilt rail or to be used as a hold down.

In Figure 23 the ladder tape is secured at the center by staples or pins and a clip goes around the outside of the pins turned over to present a neat appearance.

In Figure 24 a spring wire clip 80 is used in which the loose end passes over the rail and the end hooks behind the vertical riser that carries the loop through which the lift cord or tape 15 passes. A clip or knot below the wire loop keeps the lift cord from coming out or a hook attached to the end of the lift cord could hook in the wire loop to form a detachable lift cord connection.

In Figure 25 another form of tape clip is shown in which a toothed clip 101 is placed over the rail and meshes with holes or dents in clip 102 which passes under the rail and outside the tape ends 6 to form a positive engagement of the tape ends 6 and the rail 100. If rail 100 were a tilt rail obviously the tapes would hang down and the clips 101 and 102 would be reversed also.

I do not wish in any way to limit myself to the exact details or mode of operation set forth in this specification and drawings, for it will be obvious that wide departure may be made in the way of details without departing from the spirit and scope of my invention which is set forth in the following claims.

I claim as my invention:

1. In a Venetian blind, a top tilt rail, a bottom rail, ladder tapes disposed between and connected to said rails, and slats supported on the cross rungs of said ladder tapes; the improvement wherein one of said rails comprises a pair of arched slat members having their concave faces disposed toward and spaced from each other and with their corresponding edges in engagement, a reenforcing member disposed between the slat members intermediate said edges and extending longitudinally within the rail, and a clip member extending across the outer face of at least one of said slat members and engaged about said edges for holding same in engagement and with the central body portions of the slat members firmly engaged with said reenforcing member.

2. The structure according to claim 1, wherein said one of said rails is the lower rail and wherein said ladder tapes have their lower ends in overlying relation to said clip member beneath the slat members of the rail, and a clip member overlying and concealing the said ladder tape ends.

3. The structure according to claim 1, wherein said one of said rails is the top tilt rail, and wherein the upper ends of said ladder tapes overlie said clip member, a clip member overlying said tape ends, and a member supported on the rail and having ends disposed laterally beyond the opposite edges thereof for engagement with opposed portions of the tapes for spreading same.

4. The structure according to claim 1, wherein said one of said rails is the top tilt rail and wherein the upper ends of said tapes are secured to the uppermost slat member of the rail at points intermediate the opposite edges of the rail and the reinforcing member therewithin.

5. The structure according to claim 4 wherein the securing means for said upper ends of the tapes comprise a generally U-shaped wire element for each tape end, each wire element having the bight thereof pivotally supported within a hem on the corresponding tape end, the legs of the wire elements being supported upon the upper slat member of the rail and the free ends of such legs being loosely disposed within apertures in said slat member.

6. The structure according to claim 1 together with a pair of supporting ears disposed within the rail between the slat members thereof, said ears including portions secured to opposite sides of said reenforcing member and other portions engaging the inner faces of the uppermost slat member.

7. The structure according to claim 1, wherein said one of said rails is the lower rail, and wherein the lower portion of said tape loops around the lower slat member of the rail, and said clip member having teeth on the opposed edges of the slat gripping portions which penetrate adjacent portions of the tape.

BROOKS WALKER.

References Cited in the file of this patent

UNITED STATES PATENTS

| Number | Name | Date |
| --- | --- | --- |
| 2,130,320 | Hammer | Sept. 13, 1938 |
| 2,155,985 | Waterman | Apr. 25, 1939 |
| 2,170,938 | Carreras et al. | Aug. 29, 1939 |
| 2,200,349 | Walker | May 14, 1940 |
| 2,260,726 | Rosenbaum | Oct. 28, 1941 |
| 2,391,904 | Junkunc | Jan. 1, 1943 |
| 2,397,765 | Sylvanus | Apr. 2, 1946 |
| 2,523,038 | Mayer | Sept. 19, 1950 |
| 2,573,163 | Thomson | Oct. 30, 1951 |